Aug. 31, 1948. O. F. TALLMAN Re. 23,036

EARTH ANCHOR

Original Filed Sept. 28, 1945 2 Sheets-Sheet 1

INVENTOR
OSCAR F. TALLMAN
BY Em Harrington,
ATTORNEY

EARTH ANCHOR

Original Filed Sept. 28, 1945 2 Sheets-Sheet 2

INVENTOR
OSCAR F. TALLMAN
BY Elm Harrington,
ATTORNEY

Reissued Aug. 31, 1948 Re. 23,036

UNITED STATES PATENT OFFICE 23,036

EARTH ANCHOR

Oscar F. Tallman, St. Louis, Mo., assignor to James R. Kearney Corporation, St. Louis, Mo., a corporation of Missouri Original No. 2,427,934, dated September 23, 1947, Serial No. 619,191, September 28, 1945. Application for reissue May 8, 1948, Serial No. 25,961

7 Claims. (Cl. 189—92)

This invention relates generally to earth anchors and more specifically to an earth anchor of the type which is provided with a plurality of slidably supported flukes that are movable outwardly from retracted to expanded positions in response to tamping blows directed against a part of the anchor, so as to increase the effective area of the anchor, the predominant object of the invention being to provide an earth anchor of this type which, because of its improved and unique construction and arrangement, is greatly simplified in its mechanical construction whereby said anchor may be economically produced, and which is capable of performing its intended function in an improved and highly efficient manner.

Figure 1:
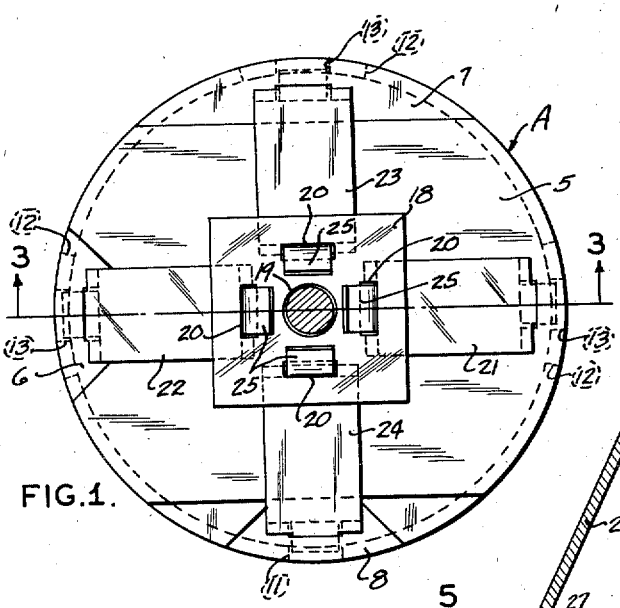
Fig. 1 is a plan view of the improved earth anchor of the present invention.
Figure 3:
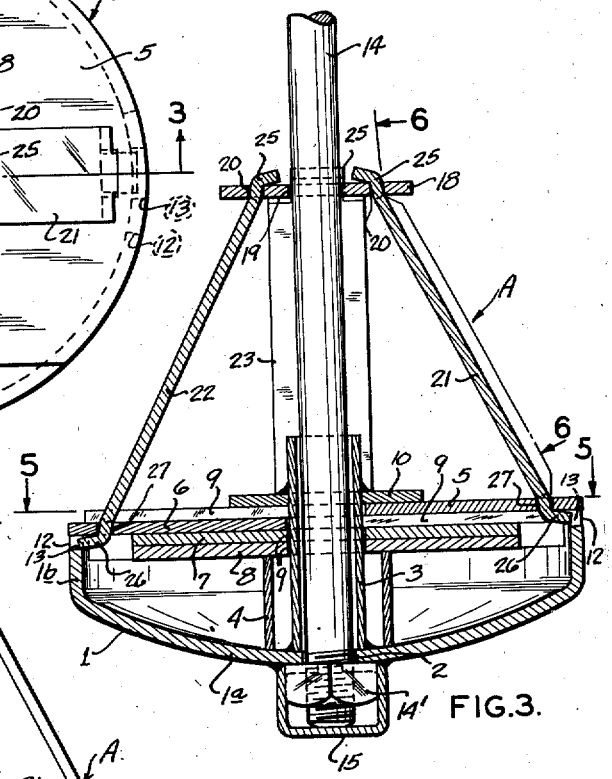
Fig. 3 is a vertical section of the earth anchor shown in Figs. 1 and 2.
Figure 4:
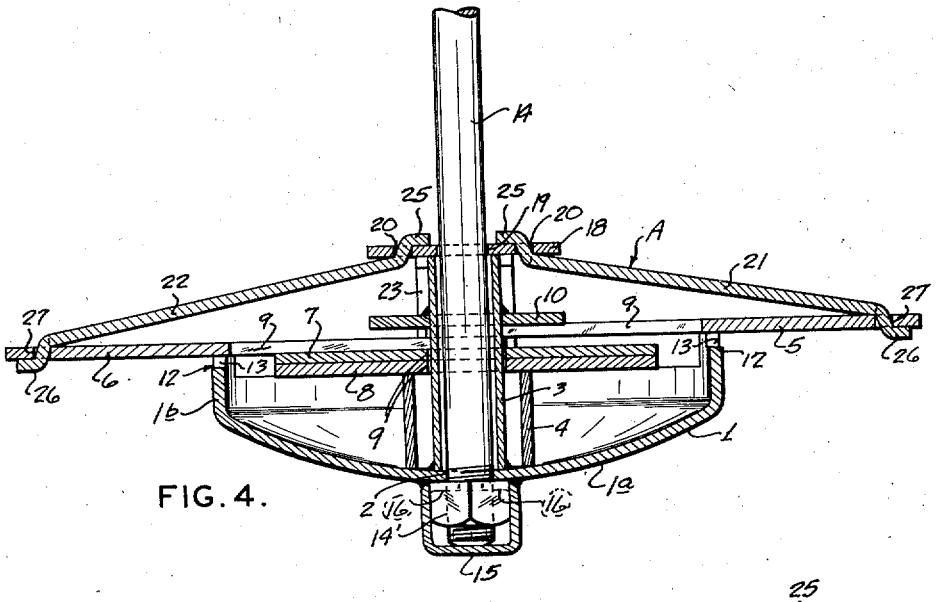
Fig. 4 is a vertical section of the improved earth anchor showing same as it appears when expanded.

In the drawings, wherein is shown for the purpose of illustration, merely, one embodiment of the invention, A designates the improved earth anchor generally. The earth anchor A includes a base member 1 which preferably is circular when viewed in plan, as shown in Fig. 1, and which is dish-shaped in vertical section, as is shown in Figs. 3 and 4, said base member comprising a curved bottom wall 1*a* which merges into an upstanding annular wall 1*b*.

Figure 5:
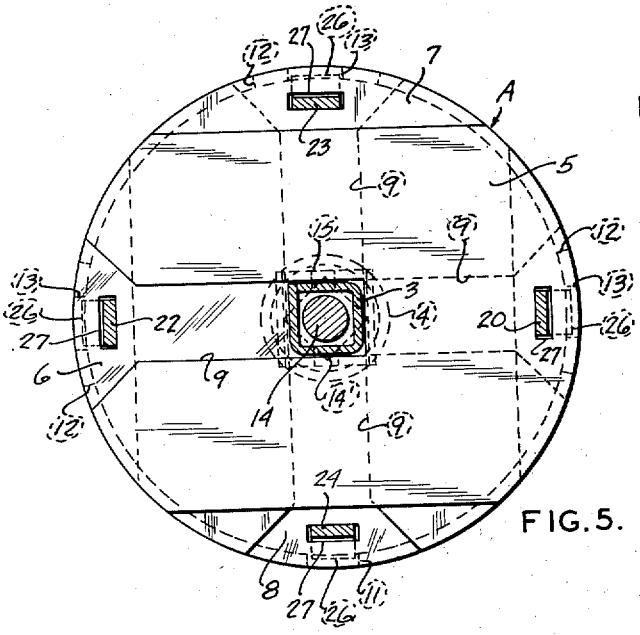
Fig. 5 is a horizontal section taken on line 5—5 of Fig. 3.

Formed through the bottom wall 1*a* of the base member 1, at the diametrical center thereof, is an opening 2, and alined with said opening 2 and extended upwardly from the bottom wall of the base member 1 is a hollow thimble 3. The particular hollow thimble 3, illustrated in the drawings, is rectangular in horizontal section, as is shown in Fig. 5, and it is secured at its lower end by welding, or otherwise, to said bottom wall of said base member. The hollow thimble 3 preferbaly, though not necessarily, is formed from a section of stamped sheet steel, said section of material being formed in the shape shown in Fig. 5 to produce a thimble of rectangular cross-sectional shape.

Arranged within the base member 1 and supported by the bottom wall thereof is a tubular element 4 which embraces the lower portion of the hollow thimble 3. The tubular element 4 serves as a support for a plurality of flukes, the particular embodiment of the invention shown in the drawings including four of such flukes which are designated by the reference characters 5, 6, 7, and 8. The flukes 5, 6, 7, and 8 are of corresponding construction, each thereof comprising a flat plate having opposed, straight, side edges, and curved edges at the opposite ends thereof. Also, each of the flukes 5, 6, 7 and 8 is provided with a slot 9 which has a straight wall at its inner end that is located at a point slightly beyond the longitudinal center of the fluke, and the outer end portion of the slot 9 of each fluke is flared. The lowermost fluke 8 rests upon the top edge of the tubular element 4, and the flukes 7, 6 and 5 are stacked on said lowermost fluke 8, with the hollow thimble 3 extending vertically through the slots 9 of the assembled flukes whose inner end portions register with each other at the center of the anchor. The hollow thimble 3 has welded, or otherwise secured thereto, a plate 10 which contacts with the top face of the uppermost fluke 5, said plate having an opening formed therethrough through which said hollow thimble extends.

From the foregoing it is plain that the flukes 5, 6, 7 and 8 are confined between the top edge of the tubular element 4 and the bottom face of the plate 10 so that they may not move vertically of the anchor structure to any substantial degree. However, the vertical spacing of the top edge of the tubular element 4 and the bottom face of the plate 10 is such that the flukes may be moved outwardly with respect to the base member 1 of the anchor without being subjected to any binding action by said tubular element and said plate. Likewise, when the flukes are being moved outwardly, in a manner to be hereinafter described, they are guided for straight-line movement by the hollow thimble during such outward movement, the opposed, straight walls of the slot 9 of each fluke contacting with correspondingly extended, opposed, straight walls of the rectangular hollow thimble so that there is no tendency for the flukes to twist or to be otherwise diverted from their true, straight-line course.

In the assembled anchor structure disclosed herein, the outer portion of the lowermost fluke 8 rests on a portion of the top edge of the annular wall 1b of the base member 1, and a notch 11 (see Fig. 2) is formed in this portion of said top edge of said annular wall of said base member which serves a function to be hereinafter set forth. Likewise, the outer portion of each of the flukes 7, 6 and 5 is supported by an extension 12 which is projected upwardly from the top edge of the annular wall 1b of the base member 1, each of said extensions being notched as indicated at 13. The extensions 12 are of different heights, the extension which supports the fluke 5 being of the greatest height, the extension which supports the fluke 6 being of intermediate height, while the extension that supports the fluke 7 is of the least height. The obvious reason for making the extensions 12 of different heights is that the flukes are stacked one above another and the extensions must be of such proper height that the bottom faces of the flukes 7, 6 and 5 will contact with the top edges of the extensions which are respectively associated with said flukes, just as the bottom face of the fluke 8 contacts with a portion of the top edge of the annular wall 1b of the base member 1.

Figure 7:
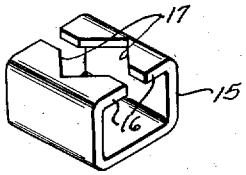
Fig. 7 is a perspective view of a part of the improved earth anchor.

Extended through the hollow thimble 3 of the anchor A is an anchor rod 14 which may be of any desired length, said rod being provided at its upper end with an eye, or other suitable means (not shown) that facilitates attachment of a guy element to said upper end of said anchor rod, and said anchor rod at its opposite end being externally screwthreaded. The base member 1 has secured thereto, at the location of the opening 2, a nut retainer 15 which is constructed and arranged as is shown to good advantage in Fig. 7. In other words, the nut retainer 15 comprises a strip of material which is bent to produce a substantially U-shaped structure, the opposite ends of which are open, and integral flanges 16 are provided which extend inwardly toward each other from the upper ends of the opposed, vertical, side walls of the nut retainer. The inturned flanges 16 are provided with opposed and alined V-shaped notches 17 which serve a purpose to be hereinafter set forth, and the nut retainer is fixed to the base member 1 by having its flanges 16 welded, or otherwise secured thereto.

Figure 2:
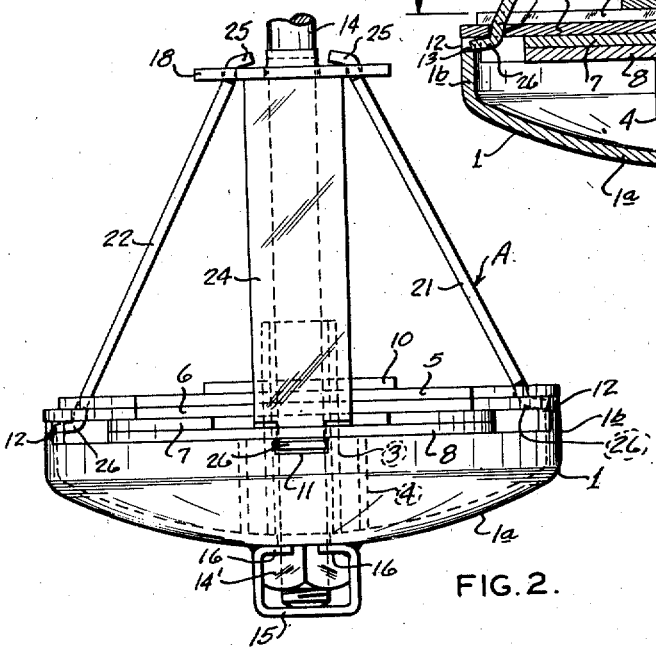
Fig. 2 is a side elevation of the earth anchor illustrated in Fig. 1.

The anchor rod 14 is secured to the anchor structure by being passed downwardly through the hollow thimble 3 and through the opening 2 of the base member 1 to the nut retainer 15, wherein a nut 14′ is arranged, said nut having been introduced into the nut retainer through an open end thereof, and the screwthreaded end portion of the anchor rod is screwed into and through the bore of the nut until the nut assumes the approximate position in which it is shown in Figs. 2, 3 and 4. The nut retainer 15 serves to hold the nut in a non-rotatable position while the screwthreaded end portion of the rod is being screwed into or out of the bore of the nut, and in this connection it is pointed out that said nut retainer will receive and retain non-rotatably any one of several sizes of square nuts. In other words, the largest nut which will be received by the nut retainer is of such size that opposed, parallel, side faces of said nut will contact with the opposed, inner faces of the vertical walls of the nut retainer to prevent rotation of the nut. A nut of this size will contact at its top face with the lower faces of the flanges 16 of the nut retainer when the anchor rod has been secured in place, the lower end face of the anchor rod contacting with the top face of the lower horizontal wall of the nut retainer. Also, nuts of such smaller sizes that they may rotate between the vertical side walls of the nut retainer, may be employed to secure the anchor rod to the anchor structure. When one of these smaller nuts is employed it is positioned within the upper portion of the nut retainer with its upper face in contact with the bottom face of the base member 1 and with its upper portion seated in the opposed V-shaped notches 17 of the flanges 16 of the nut retainer. Thus the walls of the V-shaped notches will prevent any substantial rotation of the smaller nut while the screwthreaded end portion of the anchor rod is being screwed into or out of the bore of the nut.

By providing the improved earth anchor disclosed herein with a nut retainer that holds the nut associated with the anchor rod against rotation, the anchor rod may be removed when it is desired to abandon an anchor, so as to salvage the anchor rod and, also, to remove the anchor rod as an obstruction projecting from the ground. Thus, when an anchor is to be abandoned it is necessary, merely, to rotate the anchor rod so as to unscrew its lower screwthreaded end portion from the non-rotatably held nut, and withdraw the anchor rod from the ground.

Supported by the anchor rod 14 for sliding movement longitudinally thereof is a top plate 18, said plate being provided with a centrally located opening 19 through which the anchor rod is extended and having formed therethrough a plurality of elongated apertures 20 that are of rectangular shape. In the embodiment of the invention illustrated in the drawings the top plate 18 is provided with four of the apertures 20, and associated with said top plates 18 and with the group of flukes 5, 6, 7 and 8 are four spreader arms 21, 22, 23, and 24. Each of the spreader arms 21, 22, 23 and 24 is provided at its upper end with an extension 25 of reduced width that extends through one of the apertures 20 of the top plate 18, and each of these extensions is bent inwardly above said top plate so as to prevent disengagement of the upper portion of the spreader arm from the top plate. In like manner, each of the spreader arms 21, 22, 23 and 24 is provided with an extension 26 of reduced width at its lower end that extends through an opening 27 formed through one of the flukes 5, 6, 7 or 8, the extensions 26 of the spreader arms being bent outwardly so as to prevent disengagement of the lower portions of the spreader arms from the flukes to which they are attached.

It is to be noted that all of the spreader arms 21, 22, 23 and 24 are connected at their upper ends to the top plate 18, and that each spreader arm is connected at its lower end to one of the flukes 5, 6, 7 or 8, the spreader arm 21 being connected at its lower end to the fluke 5, the spreader arm 22 being connected at its lower end to the fluke 6, the spreader arm 23 being connected at its lower end to the fluke 7, and the spreader arm 24 being connected at its lower end to the fluke 8. Also, because of the particular manner of attaching the opposite ends of the spreader arms to the top plate and the flukes, respectively, pivotal joints are provided at the points of connection of the spreader arms to the top plate and the flukes. In other words, the openings 20 of the top plate 18, and the openings 27 of the flukes 5, 6, 7 and 8 are substantially larger than the portions of the extensions 25 and 26 of the spreader arms which extend through said openings 20 and 27 of said top plate and flukes, and therefore the pivotal connections referred to above are obtained. Additionally, the notches 11 and 13 of the base member 1, previously referred to herein, are so located that the outwardly bent portions of the lower extensions 26 of spreader arms will pass through said notches when the flukes are being moved outwardly in a manner to be hereinafter described.

In the use of the improved earth anchor disclosed herein, a hole, of the desired depth, is dug in the ground which is only of sufficient diameter to receive the anchor in its collapsed condition. The collapsed anchor is introduced into this hole and is positioned at the bottom thereof with the anchor rod extended out of the top of the hole and above the surface of the ground. A suitable tamping tool is then introduced into the hole and the top plate 18 is struck tamping blows with the aid of said tamping tool, and as a result of such tamping blows the top plate 18 will be driven downwardly with respect to the anchor rod, said anchor rod guiding said top plate during downward movement thereof. As a consequence of such downward movement of the top plate 18 the spreader arms 21, 22, 23, and 24 will force the flukes 5, 6, 7 and 8 outwardly so that they penetrate into the undisturbed earth around the hole, the flukes reaching their maximum penetration of the undisturbed earth when the bottom face of the top plate 18 contacts with the top edge of the hollow thimble 3, and the top and bottom extensions 25 and 26 of the spreader arms are subjected to slight bending action just previous to the time the flukes reach the limit of their outward movement. It is to be noted that because the metal at the region of the extension is bent prior to the flukes reaching the limit of their outward movement, the flukes are locked in their expanded positions by the spreader arms. When the flukes of the earth anchor have been completely expanded as described the hole is refilled and the anchor is ready for use.

Figure 6:
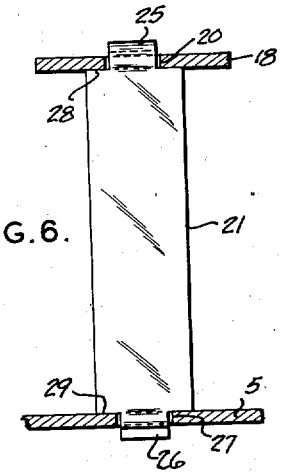
Fig. 6 is a fragmentary view partly in section and partly in elevation taken on the interrupted line 6—6 of Fig. 3.

It is to be noted that the compressive forces to which the spreader arms 21, 22, 23 and 24 are subjected when the flukes 5, 6, 7 and 8 are being expanded, are not imparted directly to the pivotal joints provided at the opposite ends of said spreader arms where the extensions 25 and 26 thereof extend through openings formed through the top plate 18 and through said flukes. Instead, the forces referred to are received by shoulders 28 and 29 (Fig. 6) which are provided at the bases of said extensions 25 and 26 of said spreader arms. In other words, the shoulders 28 at the upper ends of the spreader arms 21, 22, 23 and 24 contact with the lower face of the top plate 18, and the shoulders 29 at the lower ends of said spreader arms contact with the top faces of the various flukes to which said lower ends of said spreader arms are respectively connected, and, therefore, the compressive forces to which the spreader arms are subjected during spreading of the flukes are transmitted from the downwardly moving top plate 18 to the shoulders 28 and from the shoulders 29 to the flukes 21, 22, 23 and 24.

An extremely important feature of the invention is that the spreader arms 21, 22, 23 and 24 are inclined outwardly and downwardly when the anchor is in its fully expanded condition, as is shown in Fig. 4, because of the fact that downward movement of the top plate 18 is arrested during expansion of the anchor by contact thereof with the top edge of the hollow thimble 3.

Because of this situation the spreader arms serve as tie members which effectively resist any tendency for the outer portions of the flukes 5, 6, 7 and 8 to bend downwardly in response to upward pull exerted on the anchor rod 14. It is obvious that if the spreader arms were permitted to assume approximately horizontal positions when the anchor was in its fully expanded condition, said spreader arms would not act as tie members and in all probability the spreader arms would bend with the outer portions of the flukes if said outer portions of the flukes were bent by pull on the anchor rod. However, because the spreader arms do serve as tie members when the anchor is in its fully expanded condition, because of the elevated positions of the inner ends of said spreader arms, downward bending of the outer portions of the flukes is resisted and bending of the spreader arms is prevented.

Another desirable feature of the anchor of the present invention is that end portions of the spreader arms 21, 22, 23 and 24, which are attached to the flukes 5, 6, 7 and 8 are disposed close to the flukes, and as a result the outer portions of the flukes penetrate into the undisturbed earth, when the anchor is being expanded, much more freely than would be the case if relatively large pivot structures were provided at the outer ends of the flukes for attaching the spreader arms to the flukes, as was frequently the case heretofore. Also, while the flared outer portions of the slots 9 of the flukes 5, 6, 7 and 8 are intended primarily to provide clearance for the end portions of the spreader arms 21, 22 23 and 24 which are attached to the flukes, said flared slot portions also serve to facilitate assembly of the flukes with respect to the hollow thimble 3 by centering the slots of the flukes relative to said hollow thimble when the flukes are being introduced into place in the anchor assembling operation.

I claim:

1. An earth anchor comprising a base member, a plurality of flukes slidably supported by said base member, a plurality of flukes slidably supported by said base member for outward movement in different directions with respect to said base member, an anchor rod operatively associated with said base member and extended therefrom, an element guided by said anchor rod for sliding movement longitudinally thereof, a plurality of spreader arms connected at corresponding ends thereof to said element and connected respectively at their opposite ends to different flukes of said plurality of flukes, said spreader arms being provided with portions at opposite ends thereof which extend through openings formed through said element and said flukes respectively, said portions being bent to positions where said portions at the upper ends of said spreader arms overlie top face portions of said element and where said portions at the lower ends of said spreader arms underlie bottom face portions of said flukes, and abutments formed on said spreader arms adjacent to the opposite ends thereof which contact with faces of said element and said flukes, the relationship of the bent portions at the opposite ends of the spreader arms and said element and said flukes being such that the bendable metal of the spreader arms in the region of said bent portions is bent by the action of expanding the anchor before the flukes reach their outward limit of movement.

2. An earth anchor comprising a base member, a plurality of flukes slidably supported by said base member for outward movement in different directions with respect to said base member, an anchor rod operatively associated with said base member and extended therefrom, an element guided by said anchor rod for sliding movement longitudinally thereof, a plurality of spreader arms connected at corresponding ends thereof to said element and connected respectively at their opposite ends to different flukes of said plurality of flukes, said spreader arms being provided with portions at opposite ends thereof which extend through openings formed through said element and said flukes respectively, said portions being bent to positions where said portions at the upper ends of said spreader arms overlie top face portions of said element and where said portions at the lower ends of said spreader arms underlie bottom face portions of said flukes, and abutments formed on said spreader arms adjacent to the opposite ends thereof which contact with faces of said element and said flukes, the abutments adjacent to the upper ends of said spreader arms contacting with the lower face of said element and the abutments adjacent to the lower ends of said spreader arms contacting with the upper faces of said flukes, the relationship of the bent portions at the opposite ends of the spreader arms and said element and said flukes being such that the bendable metal of the spreader arms in the region of said bent portions is bent by the action of expanding the anchor before the flukes reach their outward limit of movement.

3. An earth anchor comprising a base member, a plurality of flukes slidably supported by said base member for outward movement in different directions with respect to said base member, an anchor rod operatively associated with said base member and extended therefrom, an element guided by said anchor rod for sliding movement longitudinally thereof, a plurality of spreader arms connected at corresponding ends thereof to said element and connected respectively at their opposite ends to different flukes of said plurality of flukes, said spreader arms being provided with portions at opposite ends thereof which extend through openings formed through said element and said flukes respectively, said portions being bent laterally to positions where said portions at the upper ends of said spreader arms overlie top face portions of said element and where said portions at the lower ends of said spreader arms underlie bottom face portions of said flukes, said base member having an upwardly extended rim portion which aids in the support of said flukes and said rim portion being provided with notches that accommodate said bent portion at the lower ends of said spreader arms, and abutments formed on said spreader arms adjacent to the opposite ends thereof which contact with faces of said element and said flukes.

4. An earth anchor comprising a base member, a plurality of flukes slidably supported by said base member for outward movement in different directions with respect to said base member, an anchor rod operatively associated with said base member and extended therefrom, an element guided by said anchor rod for sliding movement longitudinally thereof, a plurality of spreader arms connected at corresponding ends thereof to said element and connected respectively at their opposite ends to different flukes of said plurality of flukes, said spreader arms being provided with portions at opposite ends thereof which extend through openings formed through said element and said flukes respectively, said portions being bent to positions where said portions at the upper ends of said spreader arms extend inwardly and overlie top face portions of said element and where said portions at the lower ends of said spreader arms extend outwardly and underlie bottom face portions of said flukes, and abutments formed on said spreader arms adjacent to the opposite ends thereof which contact with faces of said element and said flukes, the relationship of the bent portions at the opposite ends of the spreader arms and said element and said flukes being such that the bendable metal of the spreader arms in the region of said bent portions is bent by the action of expanding the anchor before the flukes reach their outward limit of movement.

5. An earth anchor comprising a base member, a plurality of flukes slidably supported by said base member for outward movement in different directions with respect to said base member, an anchor rod operatively associated with said base member and extended therefrom, an element guided by said anchor rod for sliding movement longitudinally thereof, a plurality of spreader arms connected at corresponding ends thereof to said element and connected respectively at their opposite ends to different flukes of said plurality of flukes, said spreader arms being provided with portions at opposite ends thereof which extend through openings formed through said element and said flukes respectively, said portions being bent to positions where said portions at the upper ends of said spreader arms overlie top face portions of said element and where said portions at the lower ends of said spreader arms underlie bottom face portions of said flukes, and abutments formed on said spreader arms adjacent to the opposite ends thereof which contact with faces of said element and said flukes, the abutments adjacent to the upper ends of said spreader arms contacting with the lower face of said element and the abutments adjacent to the lower ends of said spreader arms contacting with the upper faces of said flukes, said portions of said spreader arms which extend through said openings of said element and said flukes being of less width than the main portions of the spreader arms and said abutments being in the form of shoulders located at the bases of said portions of said spreader arms, the relationship of the bent portions at the opposite ends of the spreader arms and said element and said flukes being such that the bendable metal of the spreader arms in the region of said bent portions is bent by the action of expanding the anchor before the flukes reach their outward limit of movement.

6. An earth anchor comprising a base member, a plurality of flukes slidably supported by said base member for outward movement in different directions with respect to said base member, an anchor rod operatively associated with said base member and extended therefrom, an element guided by said anchor rod for sliding movement longitudinally thereof, a plurality of spreader arms connected at corresponding ends thereof to said element and connected respectively at their opposite ends to different flukes of said plurality of flukes, said spreader arms being provided with portions at the upper ends thereof which extend through openings formed through said element and are bent to positions where said portions overlie top face portions of said element, and abutments formed on said spreader arms which contact with the lower face of said element, the relationship of the bent portions at the upper ends of the spreader arms and said element being such that the bendable metal of the spreader arms in the region of said bent portions is bent by the action of expanding the anchor before the flukes reach their outward limit of movement.

7. An earth anchor comprising a base member, a plurality of flukes slidably supported by said base member for outward movement in different directions with respect to said base member, an anchor rod operatively associated with said base member and extended therefrom, an element guided by said anchor rod for sliding movement longitudinally thereof, a plurality of spreader arms connected at corresponding ends thereof to said element and connected respectively at their opposite ends to different flukes of said plurality of flukes, said spreader arms being provided with portions at their lower ends which extend through openings formed through said flukes, said portions being bent to positions where they underlie bottom face portions of said flukes, and abutments formed on said spreader arms which contact with the top faces of said flukes, the relationship of the bent portions at the lower ends of the spreader arms and said flukes being such that the bendable metal of the spreader arms in the region of said bent portions is bent by the action of expanding the anchor before the flukes reach their outward limit of movement.

OSCAR F. TALLMAN.